United States Patent [19]

Elfert et al.

[11] 4,252,652

[45] Feb. 24, 1981

[54] PROCESS OF USING A SEMI-PERMEABLE MEMBRANE OF ACRYLONITRILE COPOLYMERS

[75] Inventors: Klaus Elfert; Hans J. Rosenkranz, both of Krefeld; Gerhard D. Wolf, Dormagen; Francis Bentz, Cologne, all of Fed. Rep. of Germany

[73] Assignee: Bayer Aktiengesellschaft, Leverkusen, Fed. Rep. of Germany

[21] Appl. No.: 74,822

[22] Filed: Sep. 12, 1979

Related U.S. Application Data

[62] Division of Ser. No. 941,687, Sep. 12, 1978, abandoned.

[30] Foreign Application Priority Data

Sep. 16, 1977 [DE] Fed. Rep. of Germany ....... 2741669

[51] Int. Cl.$^3$ ............................................. B01D 13/00
[52] U.S. Cl. ................................ 210/654; 210/500.2; 526/288
[58] Field of Search ..................... 210/500 M, 23, 22; 264/41; 526/288

[56] References Cited

U.S. PATENT DOCUMENTS

| 3,750,735 | 8/1973 | Chiang et al. | 210/500 M |
| 3,773,848 | 11/1973 | Perry et al. | 210/23 H |
| 3,799,355 | 3/1974 | Salyer et al. | 210/500 M |
| 3,799,356 | 3/1974 | Salyer et al. | 210/500 M |
| 4,056,467 | 11/1977 | Christen et al. | 210/23 F |

FOREIGN PATENT DOCUMENTS

| 867006 | 5/1961 | United Kingdom | 526/288 |
| 1143715 | 2/1969 | United Kingdom | 526/288 |

*Primary Examiner*—Ivars C. Cintins
*Assistant Examiner*—E. Rollins Cross
*Attorney, Agent, or Firm*—Connolly and Hutz

[57] ABSTRACT

A disulphimide group-containing acrylonitrile copolymer semi-permeable membrane which comprises:
(A) from 99 to 50% by weight of acrylonitrile units;
(B) from 1 to 50% by weight of units of an acrylonitrile-copolymerizable ethylenically unsaturated monomer containing one or two disulphimide groups; and
(C) from 0 to 30% by weight of units of one or more other acrylonitrile-copolymerizable olefinically unsaturated monomer, the sum of the percentages amounts to 100.

The semi-permeable membranes may be used in reverse osmosis and ultrafiltration.

1 Claim, No Drawings

PROCESS OF USING A SEMI-PERMEABLE MEMBRANE OF ACRYLONITRILE COPOLYMERS

This application is a divisional of application Ser. No. 941,687 filed Sept. 12, 1978, now abandoned.

This invention relates to semi-permeable membranes of acrylonitrile copolymers and to the use thereof in reverse osmosis and ultrafiltration.

Reverse osmosis and ultrafiltration are processes for separating substances. In these separation processes, the substances are separated by passing an aqueous solution, under pressure, through a semi-permeable membrane, the solvent and possibly some of the dissolved substances passing through the membrane, whilst the remaining components of the solution are retained on the surface of the membrane and may be concentrated in the solution.

Membranes which have acquired particular commercial significance are membranes of cellulose derivatives, particularly cellulose acetate. Despite the high permeability to water and the high power of separation thereof, they also have unfavourable properties which restrict the general serviceability thereof. These unfavourable properties include inadequate resistance to chemicals, vulnerability to degradation by microorganisms and, in particular, sensitivity to hydrolysis at high and low pH values. These various deficiencies result in gradual deterioration of the membrane.

Membranes for reverse osmosis have been produced from polyacrylonitrile, having a certain salt retention capacity, albeit with a low permeability to water (S. W. Saltonstall Jr. et al, OSW Res. Der. Progr. Report Nr. 220 (1966). German Auslegeschrift Nos. 2,145,183 and 2,346,011 describe ionic acrylonitrile copolymers which, although being highly permeable to water, are only suitable for filtering solutions of macromolecular substances, i.e. for separating particles of relatively high molecular weight.

Accordingly, an object of the present invention is to provide membranes which combine a high permeability to water with a high level of selectivity for substances of average molecular weights and which do not have any of the abovementioned disadvantages of conventional cellulose acetate membranes.

It has now surprisingly been found that it is possible to produce from acrylonitrile copolymers containing disulphimide structures membranes which do not show any of the unfavourable properties of conventional membranes based on cellulose acetate and which have a low separation limit of approximately 500 coupled with a permeability to water which is still considerably greater than, for example, that of membranes produced from pure polyacrylonitrile.

The comonomers of the acrylonitrile are olefinic comonomers containing disulphimide groups, optionally with other comonomers which contain a double bond and which may be copolymerised with acrylonitrile.

Accordingly, the present invention relates to a disulphimide group-containing acrylonitrile copolymer semi-permeable membrane which comprises (A) from 99 to 50%, by weight, of acrylonitrile units;
(B) from 1 to 50%, by weight, of units of an ethylenically unsaturated monomer containing 1 or 2 disulphimide groups which may be copolymerised with acrylonitrile; and
(C) optionally up to 30% by weight of one or more other olefinically unsaturated monomers copolymerisable with acrylonitrile, the sum of the percentages amounts to 100.

The membranes according to the present invention have, on the one hand, a high permeability to water, but, on the other hand, are capable of separating substances having a molecular weight of 500 from substances having molecular weights of about 100, the molecular weight of the dissolved component(s) being intended to be regarded as criterion for the retention or rather separation effect.

These membranes may be used for concentrating, removing or recovering a variety of different substances from aqueous solutions by reverse osmosis, ultrafiltration or similar techniques. The present invention also relates to the use of the membranes.

The polymers used in accordance with the present invention for producing the membranes comprise copolymerised units of (A) from 99 to 50%, by weight, preferably from 95 to 80%, by weight, of acrylonitrile;
(B) from 1 to 50%, by weight, preferably from 5 to 20%, by weight, of an ethylenically unsaturated monomer containing 1 or 2 disulphimide groups which is copolymerisable with acrylonitrile; and
(C) from 0 to 30% by weight, preferably from 0 to 15% by weight of one or more other olefinically unsaturated monomer which may be copolymerised with acrylonitrile, the sum of the percentages (A) to (C) amounts to 100.

copolymers of (A) and (B) and optionally (C).

It is particularly preferred to use polymers comprising copolymerised units of (A) from 99 to 50% by weight, preferably from 95 to 80%, by weight, of acrylonitrile;
(B) from 1 to 50%, by weight, preferably from 5 to 20% by weight, of a monomer corresponding to the following general formula:

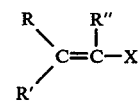

wherein
R, R' and R", which may be the same or different each represents hydrogen or methyl, preferably R and R' represent hydrogen and R" hydrogen or methyl; and
X represents a radical corresponding to the following general formula:

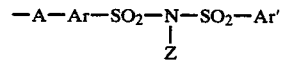

wherein
A represents an amide bridge corresponding to one of the following general formulae:

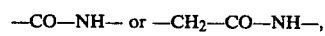

preferably —CO—NH—;
Ar represents a phenylene or naphthylene radical, a $C_1$ to $C_4$-alkylated or a halogenated (chlorine, bromine) phenylene or naphthylene radical, preferably a phenylene radical;

Ar' represents a phenyl or naphthyl radical, a $C_1$ to $C_4$ alkoxylated, a $C_1$ to $C_4$ alkylated and/or halogen-substituted (chlorine, bromine) phenyl or naphthyl radical, preferably a phenyl or chlorophenyl radical; and Z represents hydrogen, an ammonium ion or an alkali metal ion.

In principle, any ethylenically unsaturated monomers containing one or two disulphimide structures which may be copolymerised with acrylonitrile may be used as the comonomer (B) containing disulphimide groups.

Examples of such comonomers (B) are the following:

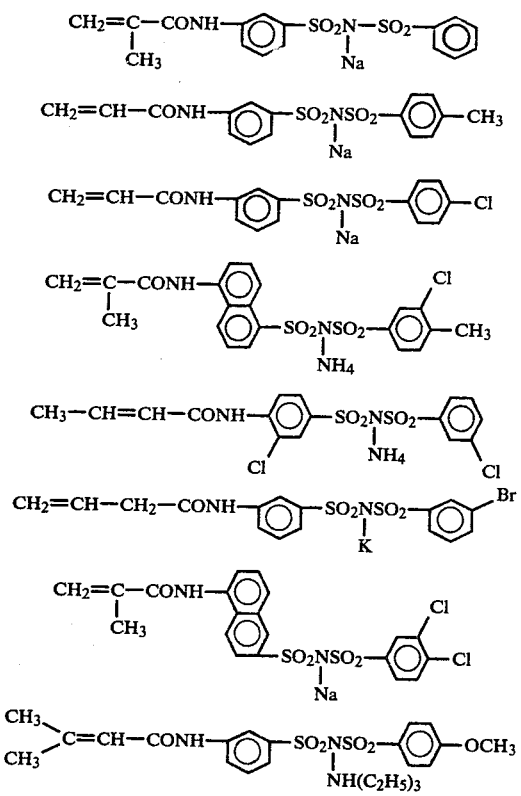

It is possible to use additionally other comonomers containing disulphimide structures providing they may be copolymerised with acrylonitrile. The following are examples of such comonomers:

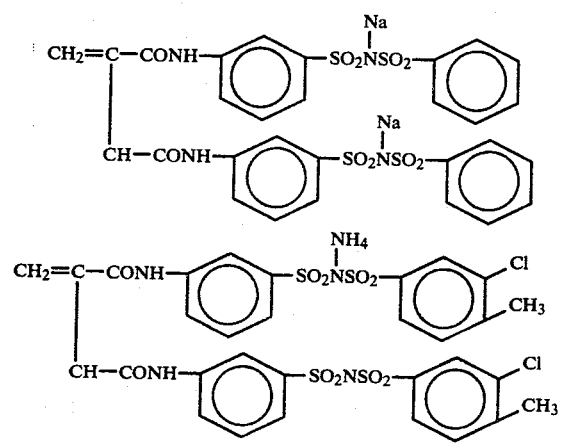

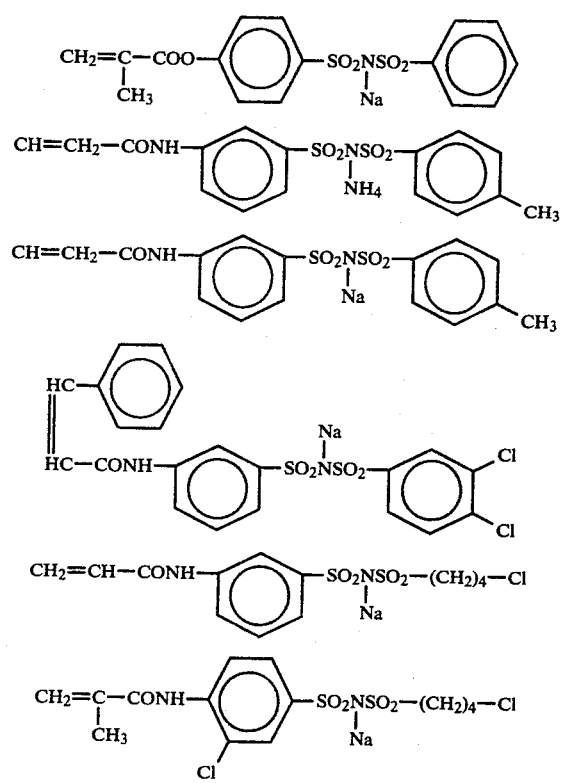

The disulphimide-containing comonomers used according to the present invention may readily be produced by processes known from the literature (cf. B. Helferich and H. Slechsig Berichte 75 (1942), p. 532 and German Pat. No. 1,235,300). In a first stage, an aromatic nitro compound containing a disulphimide structure is produced by reacting an aromatic sulphonamide with an aromatic sulphochloride (one of these components containing a nitro group) in alkaline medium. The nitro compound is then reduced to the amino compound and, finally, the resulting aromatic amino compound containing disulphimide structures is reacted with the acid chloride of an unsaturated acid.

The following compounds may be mentioned as examples of other olefinically unsaturated monomers copolymerisable with acrylonitrile which may be present in the copolymers used in accordance with the present invention (component (C)): (meth)acrylic acid, (meth)acrylamide, (meth)acrylic acid esters having 1 to 12, preferably 1 to 4 carbon atoms in the alcohol component, hydroxyalkyl (meth)acrylates with 2 to 4 carbon atoms in the alkyl group, sulphoalkyl(meth)acrylates with 2 to 4 carbon atoms in the alkyl group, maleic acid, vinyl chloride, vinylidene chloride—the foregoing monomers are preferred—further may be used vinyl ethers of unsaturated ketones, such as methyl vinyl ketone, vinyl esters of carboxylic acids, such as vinyl acetate, maleic acid semi-amides, maleic imides, vinyl pyrrolidone, vinyl carbazole, vinyl caprolactam, vinyl pyridine, vinyl imidazole, allyl hydantoin, methacrylic acid salicylate, allyl alcohol or allyl urethanes.

The copolymers of the monomers (A) to (C) are prepared according to known processes (cf. German Pat. No. 1,089,548). The monomer units are incorporated into the copolymer in a random manner.

The membranes according to the present invention are suitable for the separation and concentration of substances by reverse osmosis and ultrafiltration. In this way, it is possible to enrich effluent ingredients in the concentrate, whilst the permeate contains considerably lower concentrations of these substances. The membranes may be used for enriching and recovering valuable substances and for removing undesirable substances, for example, in the treatment of effluents in the dye, paper and textile industries.

The membranes produced from the polymers used in accordance with the present invention are preferably asymmetrical membranes which are characterised by the following structure: the actual selective separation layer is extremely thin and changes substantially continuously into a porous underlayer of the same material which serves as a supporting or protective layer. One of the advantages of such membranes is that all substances are separated on the surface of the membrane where they may be removed by the flow of the charging solution. In this way, the service life of the membranes is increased because they cannot become blocked so quickly.

The membranes according to the present invention may be produced, for example, by preparing a homogeneous solution of the corresponding polymer in a suitable solvent, preferably a solvent of the amide type. Generally, from 5 to 35% by wt. of the polymer, based on the total quantity of polymer and solvent, are dissolved in a polar aprotic solvent in the presence of, e.g., from 1 to 10%, by weight, of an alkali metal or alkaline earth metal solvent, preferably LiCl, LiBr, LiNO$_3$, MgCl$_2$, CaCl$_2$ or CaBr$_2$, or of an organic amine, such as triethylamine, tripropylamine, pyridine, ethanolamine or triethanolamine. Preferred solvents are dimethyl formamide, dimethyl-acetamide, N-methyl pyrrolidone, hexamethyl phosphoric acid triamide, and dimethyl sulphoxide or mixtures thereof. Dissolution may optionally be accelerated by heating. This casting solution may be used for film formation by applying it to a suitable substrate, e.g. glass or metal, for example, to a moving belt or to a drum, in a layer thickness of from 150 to 500$\mu$.

The solvent may be partly evaporated by a heat treatment. The film is dried over a period of from 2 to 60 minutes at a temperature of from 40° to 150° C. This step may also be left out depending on the required membrane properties of the film.

Generally, after a cooling phase lasting 10 min., the film is immersed in a precipitation bath for 60 minutes. Suitable precipitation media are solvents of the type which are miscible with the organic solvent of the casting solution and, optionally, are capable of dissolving the salt, but which represent a non-solvent for the polyamide. Solvents suitable for this purpose include water, methanol, ethanol and i-propanol, optionally with added salts, such as CaCl$_2$. The preferred precipitant is water. The temperature of the precipitation bath may be from 0° to 50° C., preferably 0° to 25° C.

The membranes according to the present invention may be used in the form of films, pipes, tubes or hollow fibres. The techniques for producing tubes, pipes and hollow fibres correspond to the process described above. In this case, the processes known to those skilled in the art for producing pipes, tubes and hollow fibres from polymer solutions are used.

In order to determine the properties of the membrane, the membrane is placed on a porous sintered plate of metal carrying a filter paper and introduced into a pressure filtration apparatus in which the various solutions of the test substances in water are pumped past the membrane surface at room temperature and under various pressures. The pump output amounts to 21.5 liters per hour and the effective membrane surface to approximately 40 cm$^2$.

The throughput of water in liters per square meter per day indicates the filtration capacity of the membrane. The percentage retention is normally expressed as follows:

$$\text{Retention} = \left(1 - \frac{\text{concentration of dissolved substance in the filtrate}}{\text{concentration of dissolved substance in the starting solution}}\right) \times 100$$

The percentages given in the Examples are by weight, unless otherwise indicated.

COMPARISON EXAMPLE 12 g of a homopolymer of acrylonitrile are dissolved in 84.4 g of N-methyl pyrrolidone to which 3.6 g of CaCl$_2$ has been added. A 250$\mu$ thick film is prepared from this casting solution on a glass plate, after which the solvent is evaporated for 20 minutes at 70° C. and the film immersed in a precipitation bath (ice/water). A wather throughflow of 1100 l/m$^2$/d was measured at 20 bars, the removal of Congo red amounting to 99.9%.

EXAMPLE 1

504 parts, by weight, of acrylonitrile and 224 parts, by volume, of a 25% aqueous solution of the following compound:

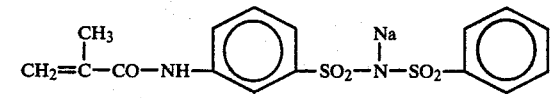

are heated to 50° C. in 7440 ml of water. The pH is then adjusted to 3 using dilute sulphuric acid and the polymerisation reaction is initiated by the addition of 7 parts, by weight, of potassium peroxodisulphate and 28 parts, by weight, of sodium sulphite. After 6 hours, the precipitated polymer is filtered under suction, washed until neutral and dried. Yield: 505 g (90% of the theoretical yield), K-value: 91. K-value defined according to Fikentscher, Cellulosechemie 13 (1932), p. 60

A solution was prepared from 12 g of the polymer, 3.6 g of CaCl$_2$ and 94.4 of N-methyl pyrrolidone by stirring and heating to 60° C. A solution ready for casting is obtained after filtration and the removal of any residual air bubbles.

A film is applied to a glass plate in a thickness of 250$\mu$ and subsequently heated on a heating plate for 20 minutes at 60° C. After a cooling phase lasting 10 minutes, the film was immersed for 30 minutes in an ice/water bath. During this period the film separated from the glass plate. The completed membrane was stored in water at room temperature.

This membrane had a pure water throughflow of 4500 l/m$^2$/d under a pressure of 40 bars.

The results obtained with this membrane and various test solutions are set out in the following Table.

| Substance | Concentration % | % retention |
| --- | --- | --- |
| NaCl | 1 | 8 |
| Na₂SO₄ | 1 | 14 |
| urea | 1 | 7 |
| phenol (pH 10) | 1 | 35 |
| sodium benzene sulphonate | 1 | 10 |
| sodium dodecyl sulphate | 1 | 85 |
| fuchsine | 0.1 | 99.9 |
| Congo red* | 0.1 | 100 |

*pressure 20 bars, water throughflow 5600 l/m²/d

EXAMPLE 2

459.2 parts, by weight, of acrylonitrile and 100.0 parts, by weight, of the following compound:

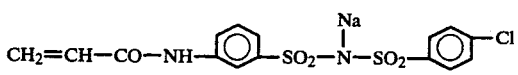

are dissolved in 7440 parts, by volume, of water. The pH is adjusted to 3 by the addition of dilute sulphuric acid at 50° C. and the polymerisation reaction is initiated by the addition of 6.5 parts, by weight, of potassium peroxodisulphate and 26 parts, by weight, of sodium sulphite. After 6 hours, the polymer is filtered under suction, washed until neutral and dried. Yield: 518 parts, by weight, (92.5% of the theoretical yield), K-value: 89.

A casting solution was prepared from 12 g of the polymer, 3.6 g of CaCl₂ and 84.4 g of N-methyl pyrrolidone. The casting solution was cast into a 250μ thick film. The solvent was evaporated for 20 minutes at 60° C., after which the substrate, together with the film, was immersed in ice/water. This membrane produced the test results shown in the following Table:

Pure water throughflow: 3900 l/m²/d, pressure 40 bars

| Substance | Concentration % | % retention |
| --- | --- | --- |
| NaCl | 1 | 0 |
| Na₂SO₄ | 1 | 5 |
| sodium dodecyl sulphate | 1 | 87 |
| cane sugar | 5 | 75 |
| Congo red | 0.1 | 100 |

EXAMPLE 3

448 parts, by weight, of acrylonitrile, 28 parts, by weight, of methylacrylate and 224 parts, by weight, of a 25% aqueous solution of the following compound:

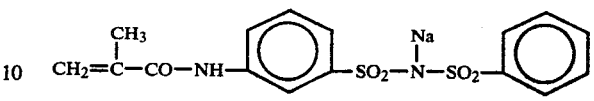

are dissolved under nitrogen at 50° C. and the pH of the resulting solution adjusted to 3 by the addition of dilute sulphuric acid. Following the addition of 5.5 parts, by weight, of potassium peroxodisulphate and 22 parts, by weight, of sodium sulphite, the mixture is stirred for 6 hours, filtered under suction, washed until neutral and dried. Yield: 498 parts, by weight, (89% of the theoretical yield), K-value: 86.5.

15 g of the polymer and 45 g of CaCl₂ were dissolved in 80.5 g of N-methyl pyrrolidone. The casting solution was used for producing a 250μ thick film which was dried for 10 minutes at a temperature of 70° C. The film was then introduced into an ice/water bath. This membrane had the following properties:

Pure water throughflow: 1500 l/m²/d, pressure: 40 bars.

| Substance | Concentration % | % retention |
| --- | --- | --- |
| NaCl | 1 | 15 |
| Na₂SO₄ | 1 | 16 |
| urea | 1 | 18 |
| phenol | 1 | 15 |
| phenol (pH 10) | 1 | 30 |
| sodium benzene sulphonate | 1 | 12 |
| sodium dodecyl sulphate | 1 | 93 |
| cane sugar | 5 | 82 |
| Congo red | 0.1 | 100 |

We claim:

1. In the process of separating materials by reverse osmosis and ultrafiltration wherein one of the materials to be separated selectively passes through a semi-permeable membrane the improvement comprises the semi-permeable membrane being a membrane of a disulphimide group-containing copolymer comprising
   (A) from 99 to 50% by weight, of acrylonitrile units;
   (B) from 1 to 50%, by weight, of units of an acrylonitrile-copolymerisable ethylenically unsaturated monomer containing one or two disulphimide groups;
   (C) from 0 to 30% by weight of units of one or more other acrylonitrile-copolymerisable olefinically unsaturated monomers, the sum of the percentages amounts to 100.

* * * * *